(12) United States Patent
Tiwari

(10) Patent No.: US 9,900,156 B2
(45) Date of Patent: Feb. 20, 2018

(54) CLOUD SERVICE VALIDATION

(71) Applicant: Cisco Technology Inc., San Jose, CA (US)

(72) Inventor: Arvind Tiwari, Fort Collins, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 2 days.

(21) Appl. No.: 14/687,731

(22) Filed: Apr. 15, 2015

(65) Prior Publication Data

US 2016/0308851 A1    Oct. 20, 2016

(51) Int. Cl.
H04L 9/32 (2006.01)
H04L 29/06 (2006.01)
H04L 9/14 (2006.01)

(52) U.S. Cl.
CPC ............. H04L 9/3242 (2013.01); H04L 9/14 (2013.01); H04L 63/0823 (2013.01); H04L 63/126 (2013.01)

(58) Field of Classification Search
CPC . H04L 63/083; H04L 9/3242; H04L 63/0428; H04L 2209/24
USPC ........................................................ 713/168
See application file for complete search history.

(56) References Cited

U.S. PATENT DOCUMENTS

| 2010/0065629 | A1* | 3/2010 | Wentker | G06Q 20/40 235/382 |
| 2010/0250949 | A1* | 9/2010 | Torino | H04L 63/0823 713/176 |
| 2012/0100832 | A1* | 4/2012 | Mao | H04W 12/06 455/411 |
| 2013/0024919 | A1* | 1/2013 | Wetter | G06F 21/335 726/6 |
| 2014/0208119 | A1* | 7/2014 | Chang | H04L 9/3213 713/176 |
| 2015/0295905 | A1* | 10/2015 | Leicher | H04W 12/06 726/4 |
| 2016/0259936 | A1* | 9/2016 | Mukherjee | G06F 21/45 |

FOREIGN PATENT DOCUMENTS

WO    WO 2009050329 A1 *  4/2009    ............. G06Q 10/00

* cited by examiner

*Primary Examiner* — Mohammad W Reza
(74) *Attorney, Agent, or Firm* — Ronald Fernando

(57) ABSTRACT

In one embodiment, a method includes sending, to a user device, a token, wherein the token includes a token identifier and a signature based on a key and data regarding a cloud service provider, receiving, from the cloud service provider, a validation request for the user device, wherein the validation request includes the token identifier, and sending, to the cloud service provider in response to the first validation request, a validation response based on the key.

20 Claims, 10 Drawing Sheets

CLOUD SERVICE VALIDATION

TECHNICAL FIELD

The present disclosure relates generally to cloud services, and in particular, to systems, methods and apparatuses enabling authorization and validation of user devices to access cloud services.

BACKGROUND

The ongoing development, maintenance and expansion of network-based systems often involves providing an increasing number of cloud services to users to allow them access to increased functionality. Authentication and authorization systems are increasingly being used to ensure that only users authorized to access each cloud service do so. However, these systems suffer from various drawbacks, such as not being scalable as the number of users and/or cloud services increases.

As the number of cloud services increases, authentication tokens provided by a cloud-based access management system correspondingly increase in size, presenting problems with storing the tokens and/or repeatedly transmitting the tokens over the network to various cloud service providers. Further, many implementations lack sufficient security mechanisms to ensure that only users authorized to access each cloud service do so. In some implementations, encryption of the token provides a measure of security, but increases the size of the token, further exacerbating the problems of storing and/or transmitting the token.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
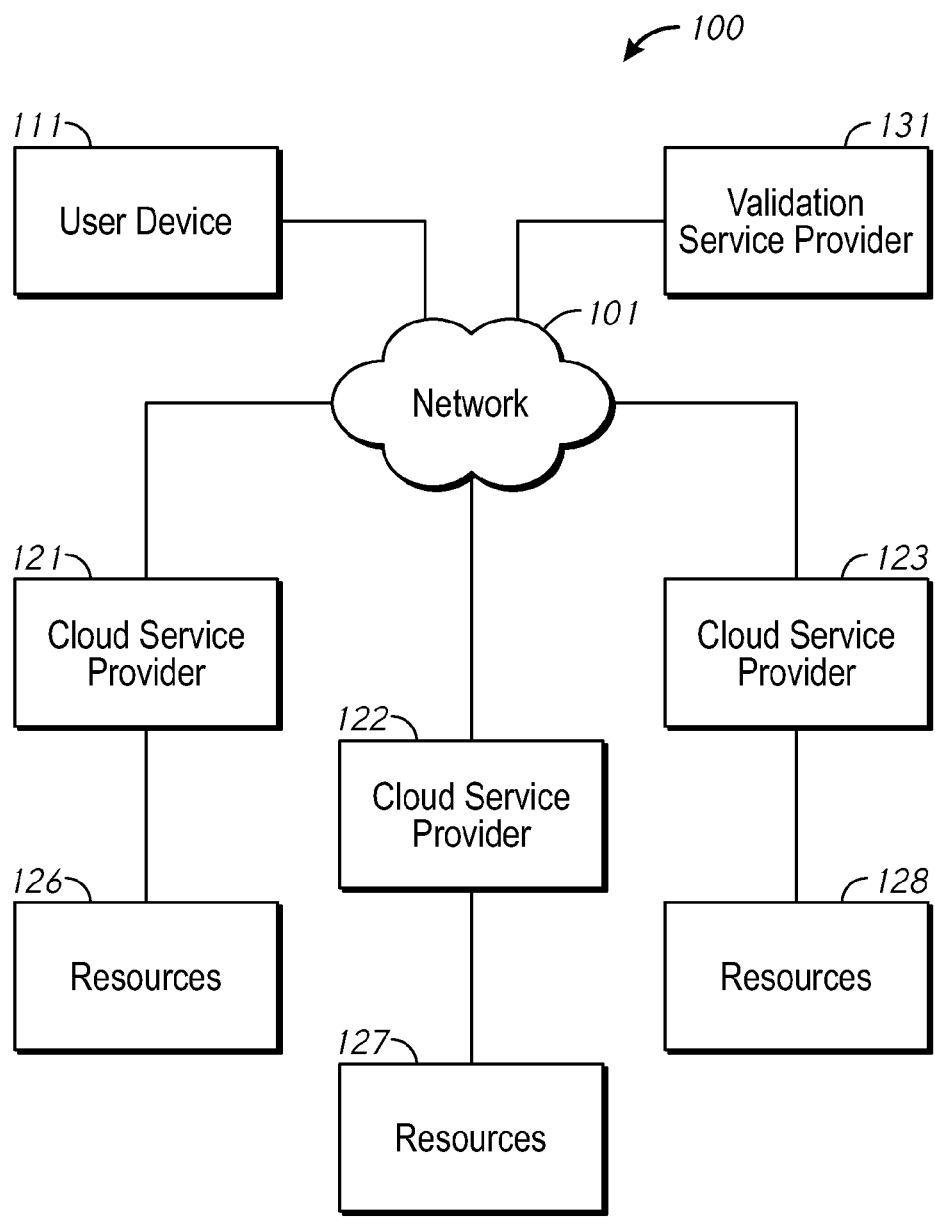
FIG. 1 is a block diagram of a data network in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein include apparatuses, systems, and methods for validating a user device with respect to a cloud service provider. For example, in some implementations, a method includes sending, to a user device, a token, wherein the token includes a token identifier and a signature based on a key and data regarding a cloud service provider, receiving, from the cloud service provider, a validation request for the user device, wherein the validation request includes the token identifier, and sending, to the cloud service provider in response to the validation request, a validation response based on the key.

In other implementations, a method includes receiving, from a user device, an access request, wherein the access request includes a token identifier, data regarding a cloud service provider, and a signature, sending, to a validation service provider, a validation request for the user device, wherein the validation request includes the token identifier, receiving, from the validation service provider, a validation response, and providing the user device access to the cloud service provider based on the validation response.

Example Embodiments

To reduce the workload of on-site computing devices, users access cloud-based computing services to perform one or more computing functions, such as data processing or storage. A cloud-based validation system ensures that only users authorized to access cloud services do so. In some implementations, the validation system generates authentication tokens that indicate, among other things, the cloud services that a user is authorized to access. As the number of cloud services increases, the size of the token grows correspondingly large. This presents problems with the storage and/or transmission of the tokens.

Accordingly, in some implementations as described herein, a signature-based authorization using cryptographic keys is used to reduce the token storage requirements of the validation system and reduce the amount of data transmitted over the network to validate a user device with respect to a cloud service provider.

FIG. 1 is a block diagram of a data network 100 in accordance with some implementations. While certain specific features are illustrated, those of ordinary skill in the art will appreciate from the present disclosure that various other features have not been illustrated for the sake of brevity and so as not to obscure more pertinent aspects of the example implementations disclosed herein. To that end, the data network 100 includes a user device 111 coupled, via a network 101, to a number of cloud service providers 121-123. In some implementations, the cloud service providers 121-123 are referred to as cloud service endpoints, cloud endpoints, or endpoints. The user device 111 and cloud service providers 121-123 are similarly coupled, via the network 101, to a validation service provider 131. The network 101 includes any public or private LAN (local area network) and/or WAN (wide area network), such as an intranet, an extranet, a virtual private network, and/or portions of the Internet.

Each cloud service provider 121-123 includes a suitable combination of hardware, firmware, and software for providing a cloud service to the user device 111 (and/or other user devices). Each cloud service provider 121-123 includes or is coupled to resources 126-128 for providing the cloud service to the user device 111. The resources 126-128 include one or more of hardware resources, such as processors and storage, and software resources, such as operating systems and applications. In some implementations, each cloud service provider 121-123 provides an application programming interface (API) by which the user device 111 can access the resources 126-128 via the cloud service provider 121-123. In some implementations, the API is a web-based API.

In some implementations, the cloud service provider 121 provides a computing cloud service for, among other things, performing computing jobs. The cloud service provider 121 includes or is coupled to resources 126 including one or more processors for performing the computing jobs. Thus, in some implementations, the user device 111 provides a job to the cloud service provider 121, which includes input data and instructions to process the input data, and receives results from the cloud service provider 121. In some implementations, the cloud service provider 121 instantiates one or more virtual machines for performing the job.

In some implementations, the cloud service provider 122 provides a storage cloud service for, among other things, storing data. The cloud service provider 122 includes or is coupled to resources 127 including one or more storage devices for storing data. Thus, in some implementations, the user device 111 provides data to the cloud service provider 122 and retrieves the data from the cloud service provider 122 at a later time.

In some implementations, the cloud service provider 123 provides a networking cloud service for, among other things, managing networks and IP (Internet Protocol) addresses. The cloud service provider 123 includes or is coupled to resources 128 including routers (e.g., one or more physical devices or virtual devices) that route network data. Thus, in some implementations, the user device 111 requests that the cloud service provider 123 instantiate one or more networks and interacts via the network through the cloud service provider 123.

Although particular examples of cloud service providers 121-123 and corresponding resources 126-128 are provided above, it is to be appreciated that, in various implementations, aspects of this disclosure are implemented with other types of cloud service providers and/or other types of computing resources.

As noted above, the user device 111 and cloud service providers 121-123 are coupled, via the network 101, to a validation service provider 131. The validation service provider 131 provides a validation service that manages access by the user device 111 of the cloud services provided by the cloud service providers 121-123. In some implementations, the validation service provider 131 authorizes the user device 111 to access one or more of the cloud service providers 121-123. In some implementations, the validation service provider 131 authorizes the user device 111 to access portions of the one or more cloud service providers 121-123, such as resources associated with one or more projects. In some implementations, the validation service provider 131 authorizes the user device 111 to access specific functionality of the one or more cloud services or projects thereof, such as the functions of an administrator role or the functions of a user role.

In some implementations, without authorization from the validation service provider 131, the user device 111 is not provided access to the cloud service providers 121-123 (or, more specifically, to the cloud services provided by the cloud service providers 121-123 or the resources 126-128 of the cloud service providers 121-123). Thus, in some implementations, each cloud service provider 121-123 conditions the provision of service to a user device 111 upon receiving an indication that the user device 111 is authorized to access the cloud service provider 121-123. In some implementations, the indication is received by the cloud service providers 121-123 from the validation service provider 131. In some implementations, the indication is received by the user device 111 from the validation service provider 131 and provided to the cloud service providers 121-123 by the user device 111.

Figure 2:
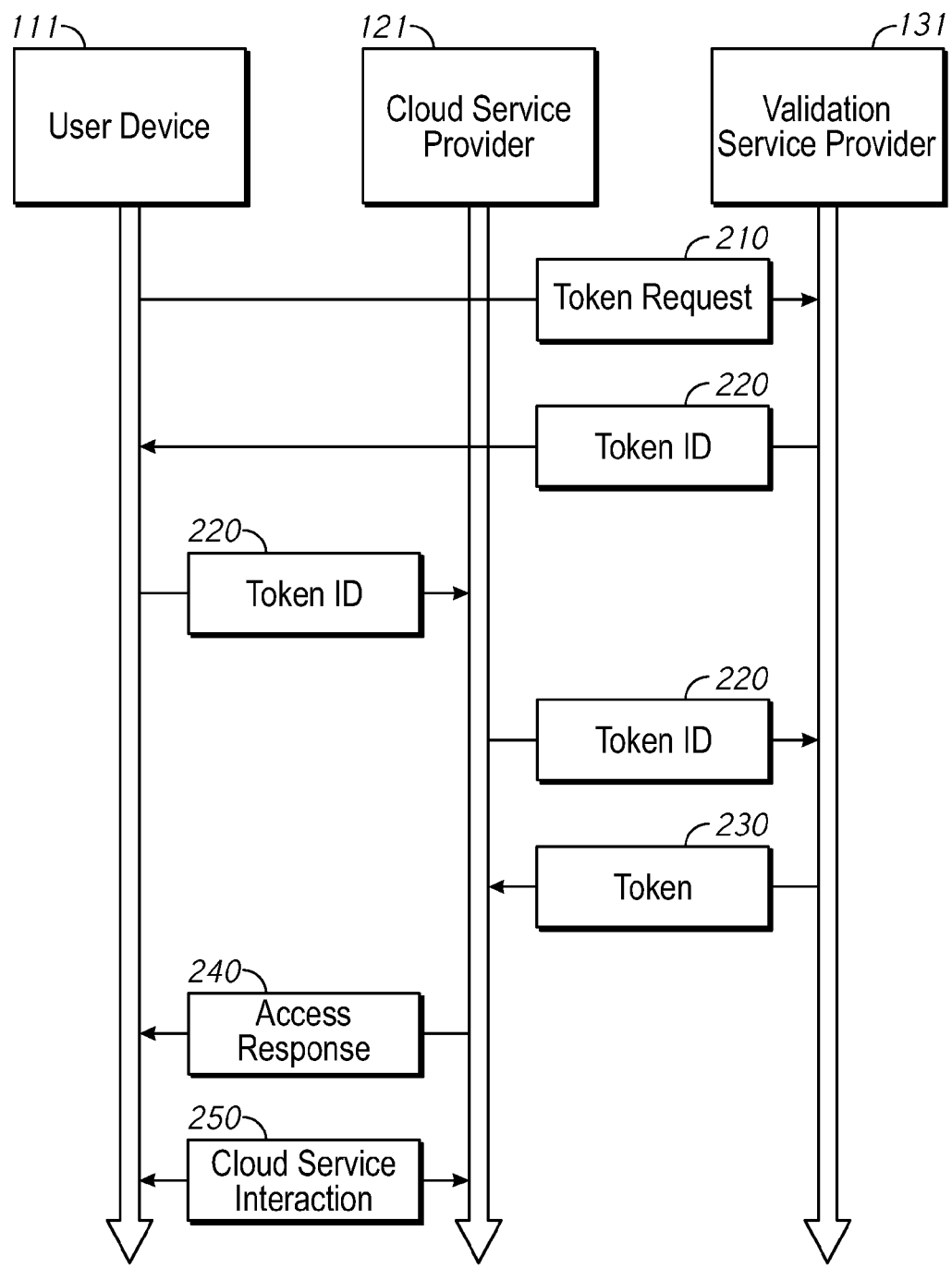
FIG. 2 is a signaling diagram of plain-text authorization in accordance with some implementations.

FIG. 2 is a signaling diagram of plain-text authorization in accordance with some implementations. A user device 111 transmits a token request 210 to a validation service provider 131. In some implementations, the token request 210 includes user credentials such as a user name and a password. In some implementations, the user device 111 receives the user credentials from a user of the user device 111 via an input device, such as a keyboard.

In response to the token request, the validation service provider 131 generates a token. The token indicates the cloud service providers the user device 111 is authorized to access. In some implementations, the validation service provider 131 stores a set of user credentials in association with authorized cloud service providers and generates the token based on the received user credentials. In some implementations, the token further indicates one or more projects that the user device 111 is authorized to access and/or one or more functionalities that the user device 111 is authorized to perform. For example, in some implementations, the token includes a project identifier and/or a role indication (e.g., an administrator role or a user role). In some implementations, the token includes an expiration time. In some implementations, the token includes a token identifier 220. In some implementations, the token identifier 220 is a universally unique identifier (UUID).

The validation service provider 131 stores the token and responds to the token request 210 by transmitting a token response to the user device 111. The token response includes the token identifier 220.

To access a cloud service provider 121, the user device 111 transmits an access request to the cloud service provider 121. In FIG. 2, the access request includes the token identifier 220 received from the validation service provider 131. Before providing the user device 111 access to the cloud service provider 121, the cloud service provider 121 validates the user device 111. To that end, the cloud service provider 121 transmits a validation request to the validation service provider 131. In FIG. 2, the validation request includes the token identifier 220 received from the user device 111.

In response to receiving the validation request including the token identifier 220 from the cloud service provider 121, the validation service provider 131 transmits a validation response including the token 230 to the cloud service provider 121. As noted above, the token 230 indicates the cloud service providers the user device 111 is authorized to access. Based on the information in the token 230, the cloud service provider 121 determines whether the cloud service provider 121 is among those cloud service providers the user device 111 is authorized to access and transmits a corresponding access response 240 to the user device 111. In particular, if the token 230 is not expired and indicates that the user device 111 is authorized to access the cloud service provider 121, the cloud service provider 121 transmits an access response 240 indicating that access has been granted. Once access to the cloud service provider 121 is granted, the user device 111 and cloud service provider 121 exchange cloud service interactions 250 as the user device 111 accesses the cloud service provider 121 (or the portion of the cloud service provider 121 for which the user device 111 is authorized as indicated by the token 230).

Figure 3:
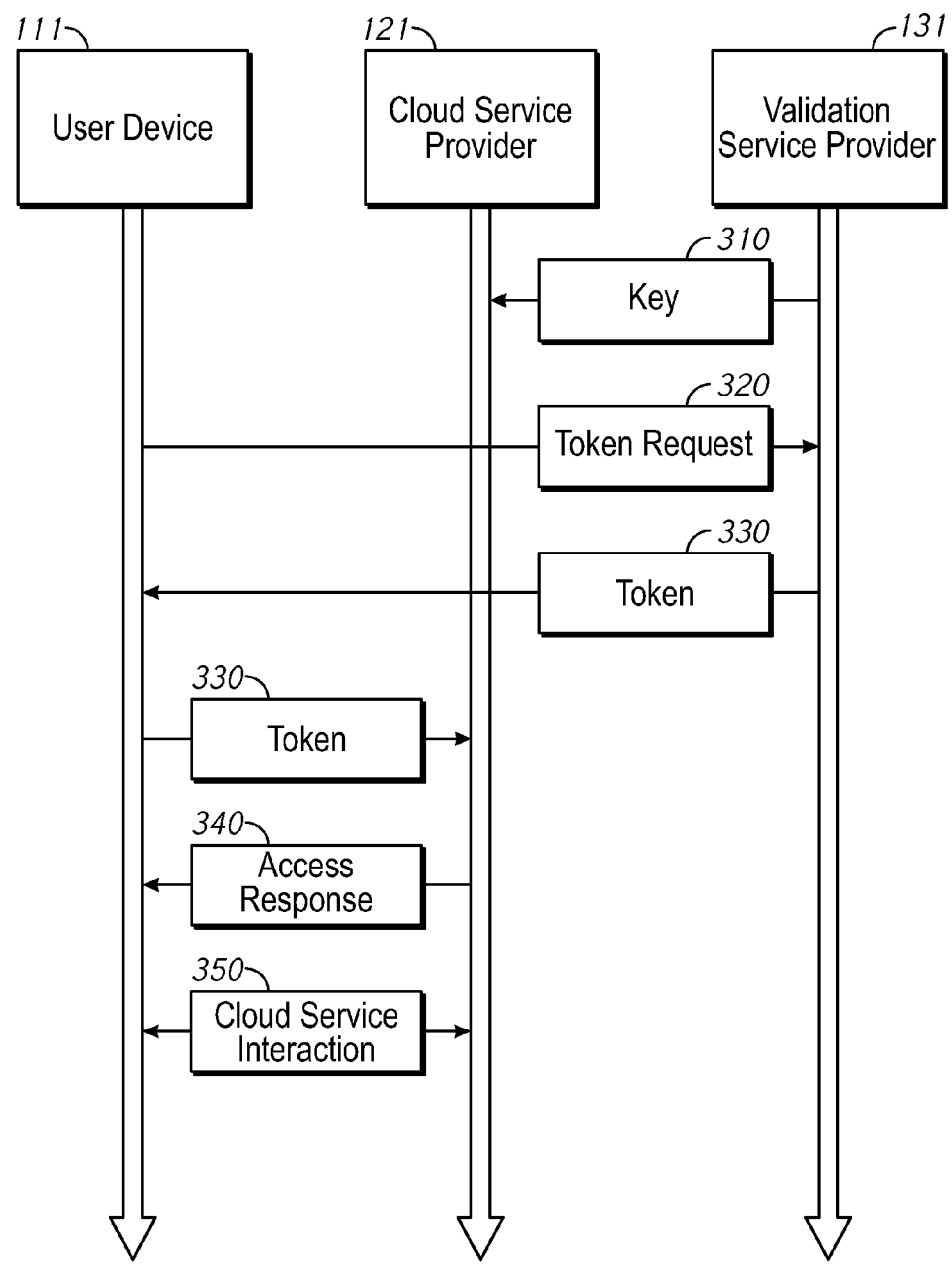
FIG. 3 is a signaling diagram of encrypted authorization in accordance with some implementations.

FIG. 3 is a signaling diagram of encrypted authorization in accordance with some implementations. To perform validation of a user device 111, the validation service provider 131 and cloud service provider 121 share knowledge of a private key 310. Thus, in some implementations, the validation service provider 131 transmits the private key 310 to the cloud service provider 121 (and possibly other cloud service providers).

At a later time, the user device 111 transmits a token request 320 to the validation service provider 131. In some implementations, the token request 320 includes user credentials such as a user name and a password. In some implementations, the user device 111 receives the user credentials from a user of the user device 111 via an input device, such as a keyboard.

In response to the token request, the validation service provider 131 generates a token. The token indicates the cloud service providers the user device 111 is authorized to access. In some implementations, the validation service 131 stores a set of user credentials in association with authorized cloud service providers and generates the token based on the received user credentials. In some implementations, the token further indicates one or more projects that the user device 111 is authorized to access and/or one or more functionalities that the user device 111 is authorized to perform. For example, in some implementations, the token includes a project identifier and/or a role indication (e.g., an administrator role or a user role). In some implementations, the token includes an expiration time.

The validation service provider 131 responds to the token request 320 by transmitting a token response to the user device 111. The token response includes the token 330 encrypted with the private key 310. In some implementations, the token response further includes the token 330 in an unencrypted format. In some implementations, the validation service provider 131 deletes the token 330 after transmitting it to the user device 111.

To access the cloud service provider 121, the user device 111 transmits an access request to the cloud service provider 121. In FIG. 3, the access request includes the token 330 encrypted with the private key 310.

The cloud service provider 121 decrypts the token 330 with the private key 310 provided by the validation service provider 131. As noted above, the token 330 indicates the cloud service providers the user device 111 is authorized to access. Based on the information in the token 330, the cloud service provider 121 determines whether the cloud service provider 121 is among those cloud service providers the user device 111 is authorized to access and transmits a corresponding access response 340 to the user device 111. In particular, if the token 330 is not expired and indicates that the user device 111 is authorized to access the cloud service provider 121, the cloud service provider 121 transmits an access response 340 indicating that access has been granted. Once access to the cloud service provider 121 is granted, the user device 111 and cloud service provider 121 exchange cloud service interactions 350 as the user device 111 accesses the cloud service provider 121 (or the portion of the cloud service provider 121 for which the user device 111 is authorized as indicated by the token 330).

As described above with respect to FIG. 2, the validation service provider 131 stores the token in some implementations. As the number of tokens grows large, e.g., for a large number of user devices, storing the tokens imposes significant overhead for the validation service provider 131. In some implementations, this problem is exacerbated by the size of the token. For example, if a user device 111 is authorized to access a large number of cloud service providers, the data in the token indicating this authorization (and, thus, the size of the token) is corresponding large. Thus, transmission of the token to each cloud service provider the user device 111 attempts to access, as in the validation response from the validation service provider 131 in FIG. 2 or the access request from the user device 111 of FIG. 3, utilizes a significant amount of network bandwidth. In some implementations, the size of the token is increased further by encryption with a private key. Further, in some implementations, the sharing of the private key between the validation service provider 131 and the cloud service provider 121 presents a security risk.

Thus, in some implementations, as described below, a user device 111 is validated without the cloud service provider 121 receiving the entire token from the user device 111 or the validation service provider 131. In some implementations, each of a plurality of user devices are validated for each of a plurality of cloud service providers without each cloud service provider receiving a token for each user device. Thus, in some implementations, network overhead is significantly reduced. In some implementations, the validation service provider 131 does not store the token after providing it to the user device 111. Thus, in some implementations, database overhead is significantly reduced. In some implementations, a user device 111 is validated without the sharing of a private key between the validation service provider 131 and the cloud service provider 121. Thus, in some implementations, security of the cloud services is increased.

Figure 4:
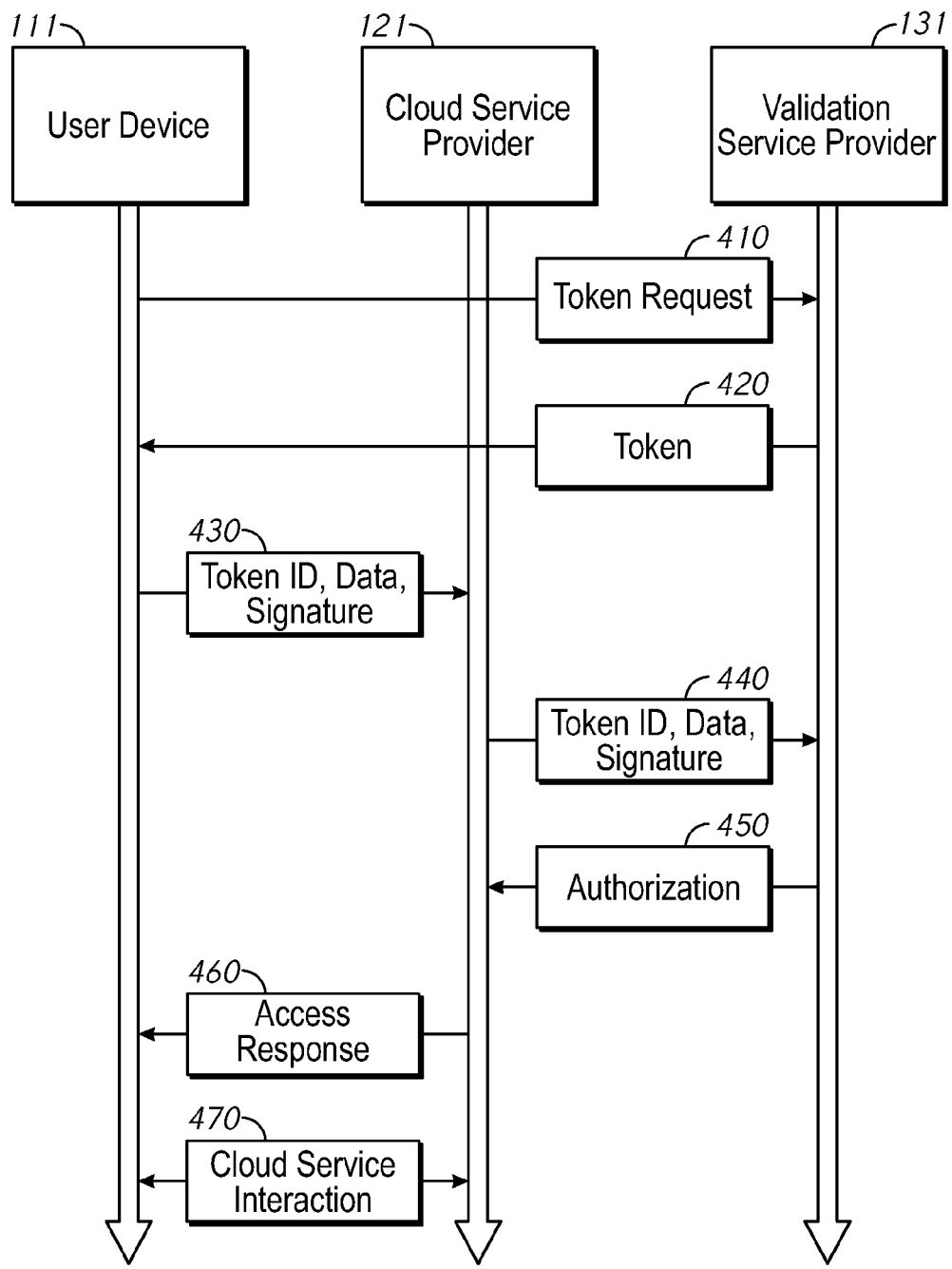
FIG. 4 is a signaling diagram of signature-based authorization including an authorization as a validation response in accordance with some implementations.

FIG. 4 is a signaling diagram of signature-based authorization including an authorization as a validation response in accordance with some implementations. The user device 111 transmits a token request 410 to the validation service provider 131. In some implementations, the token request 410 includes user credentials such as a user name and a password. In some implementations, the user device 111 receives the user credentials from a user of the user device via an input device, such as a keyboard. In some implementations, the user credentials include biometric credentials, such as a fingerprint scan or a retinal scan.

In response to the token request 410, the validation service provider 131 generates a token 420. In some implementations, the validation service 131 stores a set of user credentials in association with authorized cloud service providers and generates the token 420 based on the received user credentials. The token 420 further includes a token identifier. In some implementations, the token identifier is a universally unique identifier (UUID).

In some implementations, the token 420 is a data file, also referred to as an authentication token, that indicates, among other things, the cloud service providers the user device 111 is authorized to access. In some implementations, the token 420 is a JSON (JavaScript Object Notation) token. In some implementations, the token 420 includes a list of cloud service providers the user device 111 is authorized to access and includes, for each cloud service provider of the list, data regarding the cloud service provider 121. In some implementations, the data regarding the cloud service provider includes one or more of a URL (Universal Resource Locator) of the cloud service provider, a service identifier of the cloud service provider, and a region identifier of the cloud service provider 121.

In some implementations, the token 420 further indicates one or more projects that the user device 111 is authorized to access and/or one or more functionalities that the user device 111 is authorized to perform. For example, in some implementations, the token 420 includes a project identifier and/or a role indication (e.g., an administrator role or a user role). In some implementations, the token 420 includes an expiration time.

The token 420 further includes a signature based on a key and data regarding the cloud service provider 121. In some implementations, the validation service provider 131 generates the key in response to receiving the token request 410. In some implementations, the validation service provider 131 selects, in response to receiving the token request 410, a key from a plurality of generated keys. In some implementations, the validation service provider 131 generates the signature based on the key and the data regarding the cloud service provider 121 using a cryptographic hash function. In some implementations, the cryptographic hash function includes an MD (message-digest) cryptographic hash function, such as MD2, MD4, MD5, or MD6. In some implementations, the cryptographic has function includes an SHA (secure hash algorithm) cryptographic hash function, such as SHA-1, SHA-2, SHA-224, SHA-256, SHA-384, SHA-512, SHA-512/224, or SHA-512/256.

In some implementations, the validation service provider 131 generates a message based on the data regarding the cloud service provider 121. For example, in some implementations, the validation service provider 131 concatenates elements of the data regarding the cloud service provider 121 in a specific order to generate the message. In some implementations, the validation service provider 131 applies the key to the message to generate a message authentication code (MAC) that forms the signature. In some implementations, the validation service provider 131 applies the key using a cryptographic hash function and, thus, the signature is a hash-based MAC (HMAC), also referred to as a keyed-hash message authentication code.

As noted above, in some implementations, the token 420 includes a list of cloud service providers the user device 111 is authorized to access and includes, for each cloud service provider of the list, data regarding the cloud service provider 121. In some implementations, the token 420 includes, for each cloud service provider of the list, a signature based on a key (either the same key for each cloud service provider or different keys for each cloud service provider) and the data regarding the cloud service provider. In some implementations, the signature is further based on a project identifier and/or a role indication included in the token 420.

The validation service provider 131 responds to the token request 410 by transmitting a token response to the user device 111. The token response includes the token 420 with the signature. In some implementations, the validation service provider 131 deletes the token 420 after transmitting it to the user device 111. In some implementations, the validation service provider 131 deletes the token 420, but stores the key (or keys) in association with the token identifier. In some implementations, the validation service provider 131 stores an expiration time in association with the token identifier. In some implementations, the validation service provider 131 stores an expiration time in association with each of one or more keys.

To access the cloud service provider 121, the user device 111 transmits an access request 430 to the cloud service provider 121. In FIG. 4, the access request 430 does not include the token 420, but includes the token identifier, the data regarding the cloud service provider 121, and the signature based on the key and the data regarding the cloud service provider 121. In some implementations, the access request 430 does not include the data regarding the cloud service provider 121. In particular, in some implementations, the data regarding the cloud service provider is public data known to the cloud service provider 121 and is not provided to the cloud service provider 121 by the user device 111.

The cloud service provider 121 transmits a validation request 440 to the validation service provider 131. In FIG. 4, the validation request 440 includes the token identifier (as received from the user device 111), the data regarding the cloud service provider 121 (as received from the user device 111 or as known by the cloud service provider 121), and the signature based on the key and the data regarding the cloud service provider 121 (as received from the user device 111). In some implementations, the validation request 440 includes a message based on the data regarding the cloud service provider 121. For example, in some implementations, the cloud service provider 121 concatenates elements of the data regarding the cloud service provider 121 in a specific order to generate the message, e.g., the same order used by the validation service provider 131.

The validation service provider 131 retrieves the key associated with the token identifier (as provided by the cloud service provider 121). The validation service provider 131 generates a regenerated signature based on the key and the data regarding the cloud service provider 121 (as provided by the cloud service provider 121). In some implementations, the cloud service provider 121 transmits the data regarding the cloud service provider 121 as a message and the validation service provider 131 generates the regenerated signature by applying the key to the message.

The validation service provider 131 compares the regenerated signature to the signature of the validation request 440 (as provided by the cloud service provider 121) and determines whether the user device 111 is authorized to access the cloud service provider 121 based on the comparison. In some implementations, the validation service provider 131 determines whether the user device 111 is authorized to access the cloud service provider 121 further based on an expiration time stored in association with the key. For example, if the regenerated signature matches the signature of the validation request 440 (and, in some implementations, the expiration time has not passed), the validation service provider 131 determines that the user device 111 is authorized to access the cloud service provider 121. If the regenerated signature does not match the signature of the validation request 440 (or, in some implementations, the expiration time has passed), the validation service provider 131 determines that the user device 111 is not authorized to access the cloud service provider 121.

In response to the validation request 440, the validation service provider 131 transmits a validation response. The validation response includes an authorization 450 that indicates whether the user device 111 is authorized to access the cloud service provider 121. As noted above, the authorization 450 is based on a comparison of the regenerated signature based on the key and signature of the validation request 440. Thus, the validation response is based on the key.

The cloud service provider 121 responds to the access request 430 of the user device 111 with an access response 460. In particular, if the validation response 450 indicates that the user device 111 is authorized to access the cloud service provider 121, the cloud service provider 121 transmits an access response 460 indicating that access has been granted. Once access to the cloud service provider 121 is granted, the user device 111 and cloud service provider 121 exchange cloud service interactions 470 as the user device 111 accesses the cloud service provider 121 (or the portion of the cloud service provider 121 for which the user device 111 is authorized as indicated by the data regarding the cloud service provider 121 of the access request 430, e.g., a particular project or role).

Figure 5:
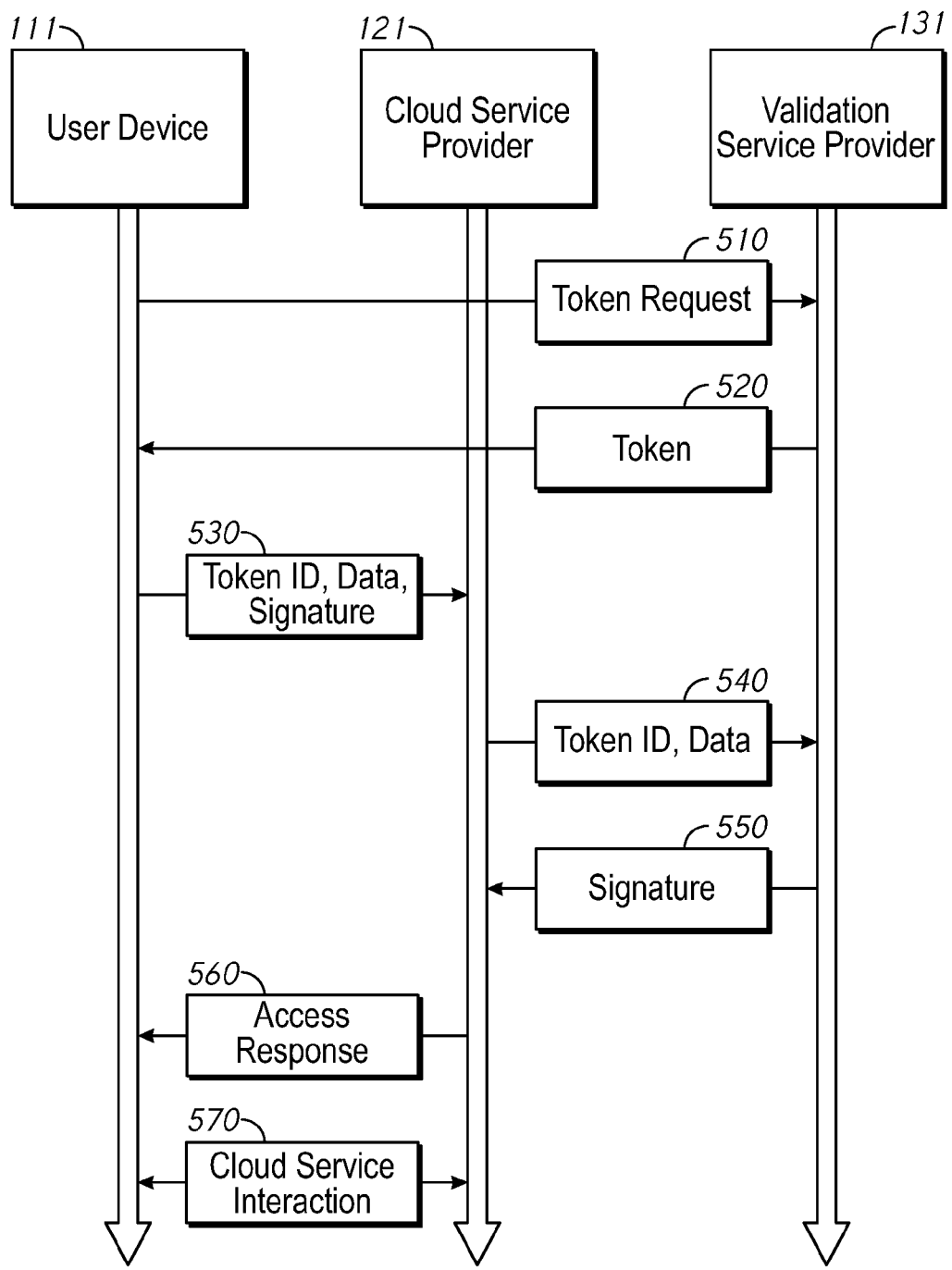
FIG. 5 is a signaling diagram of signature-based authorization including a regenerated signature as a validation response in accordance with some implementations.

FIG. 5 is a signaling diagram of signature-based authorization including a regenerated signature as a validation response in accordance with some implementations. As in FIG. 4, the user device 111 transmits a token request 510 to the validation service provider 131 and receives a token response including a token 520 from the validation service 131. In some implementations, the token request 510 and token 520 correspond to the token request 410 and token 420 of FIG. 4. As in FIG. 4, to access the cloud service provider 121, the user device 111 transmits an access request 530 to the cloud service provider 121 that does not include the token 520, but includes the token identifier, the data regarding the cloud service provider 121, and the signature based on the key and the data regarding the cloud service provider 121. In some implementations, the access request 530 does not include the data regarding the cloud service provider 121. In particular, in some implementations, the data regarding the cloud service provider is public data known to the cloud service provider 121 and is not provided to the cloud service provider 121 by the user device 111.

The cloud service provider 121 transmits a validation request 540 to the validation service provider 131. In FIG. 5, the validation request 540 includes the token identifier (as received from the user device 111) and the data regarding the cloud service provider 121 (as received from the user device 111 or as known by the cloud service provider 121). Unlike the validation request 440 of FIG. 4, the validation request 540 does not include the signature. In some implementations, the validation request 540 includes a message based on the data regarding the cloud service provider 121. For example, in some implementations, the cloud service provider 121 concatenates elements of the data regarding the cloud service provider 121 in a specific order to generate the message, e.g., the same order used by the validation service provider 131.

The validation service provider 131 retrieves the key associated with the token identifier (as provided by the cloud service provider 121). The validation service provider 131 generates a regenerated signature based on the key and the data regarding the cloud service provider 121 (as provided by the cloud service provider 121). In some implementations, the cloud service provider 121 transmits the data regarding the cloud service provider 121 as a message and the validation service provider 131 generates the regenerated signature by applying the key to the message.

In response to the validation request 540, the validation service provider 131 transmits a validation response. The validation response includes the regenerated signature 550. As noted above, the regenerated signature 550 based on the key and the data regarding the cloud service provider 121. Thus, the validation response is based on the key.

In some implementations, the validation response further includes an expiration time stored in association with the key. In some implementations, the validation response indicates that the user is not authorized to access the cloud service provider 121 if the expiration time has passed.

The cloud service provider 121 compares the regenerated signature to the signature of the access request 530 (as provided by the user device 111) and determines where the user device 111 is authorized to access the cloud service provider 121 based on the comparison. In some implementations, the cloud service provider 121 determines whether the user device 111 is authorized to access the cloud service provider 121 further based on an expiration time received in the validation response. For example, if the regenerated signature 550 matches the signature of the access request 530 (and, in some implementations, the expiration time has not passed), the cloud service provider 121 determines that the user device 111 is authorized to access the cloud service provider 121. If the regenerated signature 550 does not match the signature of the access request 530 (or, in some implementations, the expiration time has passed), the cloud service provider 121 determines that the user device 111 is not authorized to access the cloud service provider 121.

The cloud service provider 121 responds to the access request 530 of the user device 111 with an access response 560. In particular, if the cloud service provider 121 determines that the user device 111 is authorized to access the cloud service provider 121, the cloud service provider 121 transmits an access response 560 indicating that access has been granted. Once access to the cloud service provider 121 is granted, the user device 111 and cloud service provider 121 exchange cloud service interactions 570 as the user device 111 accesses the cloud service provider 121 (or the portion of the cloud service provider 121 for which the user device 111 is authorized as indicated by the data regarding the cloud service provider 121 of the access request 430, e.g., a particular project or role).

Figure 6:
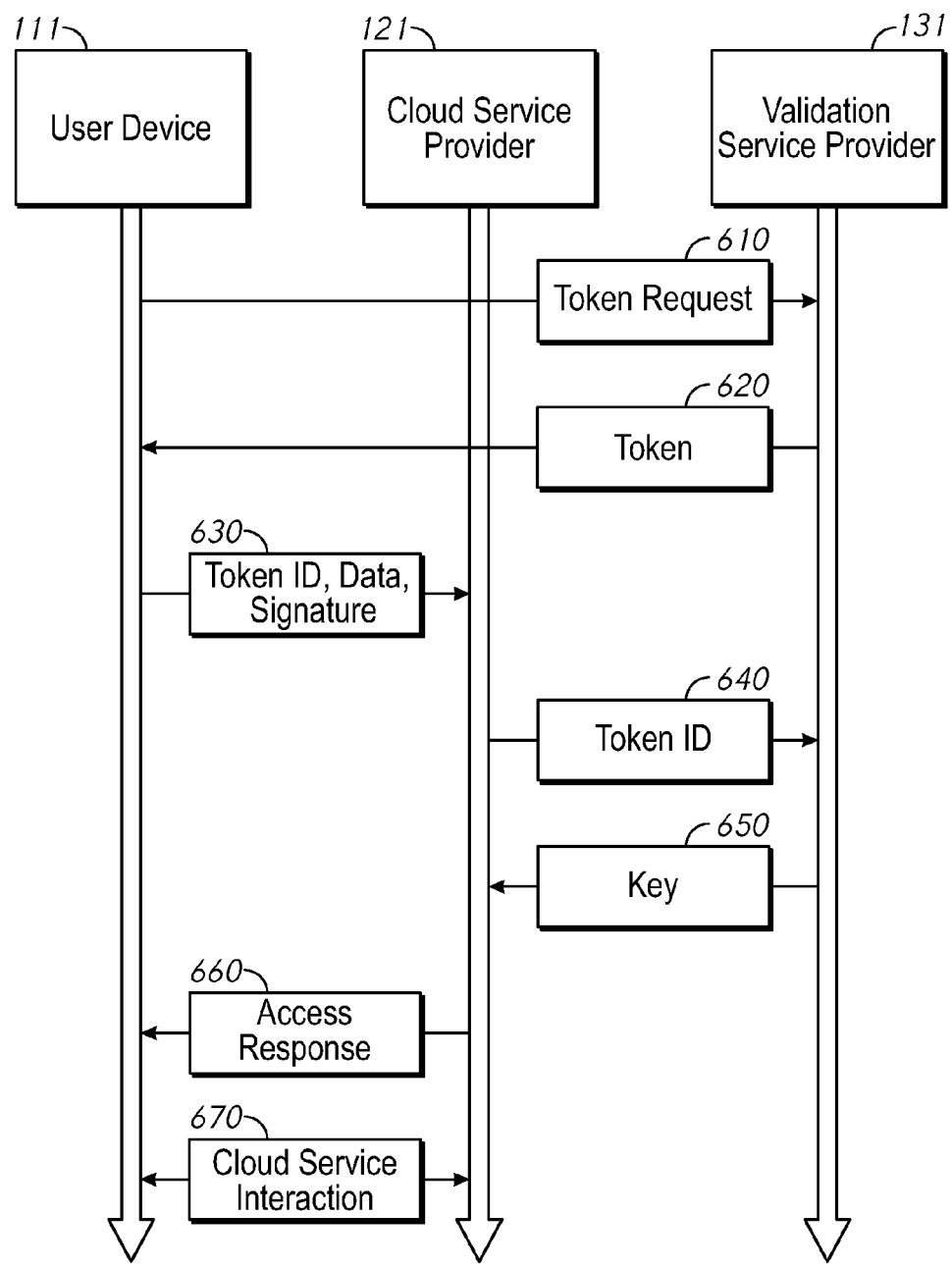
FIG. 6 is a signaling diagram of signature-based authorization including a key as a validation response in accordance with some implementations.

FIG. 6 is a signaling diagram of signature-based authorization including a key as a validation response in accordance with some implementations. As in FIG. 4, the user device 111 transmits a token request 610 to the validation service provider 131 and receives a token response including a token 620 from the validation service 131. In some implementations, the token request 610 and token 620 correspond to the token request 410 and token 420 of FIG. 4. As in FIG. 4, to access the cloud service provider 121, the user device 111 transmits an access request 630 to the cloud service provider 121 that does not include the token 620, but includes the token identifier, the data regarding the cloud service provider 121, and the signature based on the key and the data regarding the cloud service provider 121. In some implementations, the access request 630 does not include the data regarding the cloud service provider 121. In particular, in some implementations, the data regarding the cloud service provider is public data known to the cloud service provider 121 and is not provided to the cloud service provider 121 by the user device 111.

The cloud service provider 121 transmits a validation request 640 to the validation service provider 131. In FIG. 6, the validation request 640 includes the token identifier (as received from the user device 111). Unlike the validation request 440 of FIG. 4, the validation request 640 does not include the signature or the data regarding the cloud service provider 121.

The validation service provider 131 retrieves the key associated with the token identifier (as provided by the cloud service provider 121). In response to the validation request 640, the validation service provider 131 transmits a validation response. The validation response includes the key 640. Thus, the validation response is based on the key 640.

In some implementations, the validation response further includes an expiration time stored in association with the key. In some implementations, the validation response indicates that the user is not authorized to access the cloud service provider 121 if the expiration time has passed.

The cloud service provider 121 generates a regenerated signature based on the key 640 and the data regarding the cloud service provider 121. In some implementations, the cloud service provider 121 generates a message and generates the regenerated signature by applying the key to the message.

The cloud service provider 121 compares the regenerated signature to the signature of the access request 630 (as provided by the user device 111) and determines where the user device 111 is authorized to access the cloud service provider 121 based on the comparison. For example, if the regenerated signature matches the signature of the access request 630 (and, in some implementations, the expiration time has not passed), the cloud service provider 121 determines that the user device 111 is authorized to access the cloud service provider 121. If the regenerated signature does not match the signature of the access request 630 (or, in some implementations, the expiration time has passed), the cloud service provider 121 determines that the user device 111 is not authorized to access the cloud service provider 121.

The cloud service provider 121 responds to the access request 630 of the user device 111 with an access response 660. In particular, if the cloud service provider 121 determines that the user device 111 is authorized to access the cloud service provider 121, the cloud service provider 121 transmits an access response 660 indicating that access has been granted. Once access to the cloud service provider 121 is granted, the user device 111 and cloud service provider 121 exchange cloud service interactions 670 as the user device 111 accesses the cloud service provider 121 (or the portion of the cloud service provider 121 for which the user device 111 is authorized as indicated by the data regarding the cloud service provider 121 of the access request 630, e.g., a particular project or role).

Figure 7:
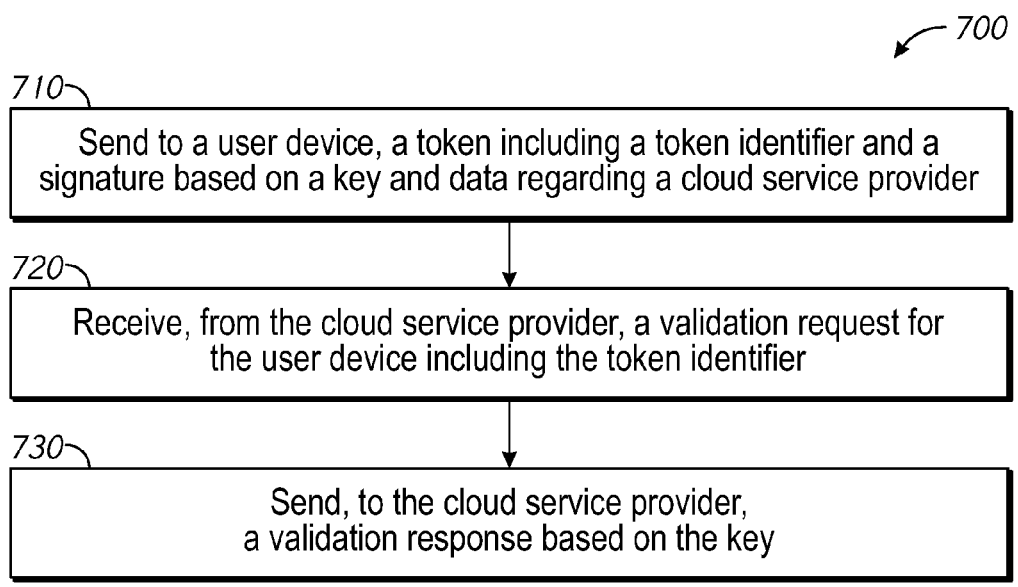
FIG. 7 is a flowchart representation of a method of validating a user device in accordance with some implementations.

FIG. 7 is a flowchart representation of a method 700 of validating a user device in accordance with some implementations. In some implementations (and as detailed below as an example), the method 700 is performed by a validation service provider, such as the validation service provider 131 of FIG. 1. In some implementations, the method 700 is performed by processing logic, including hardware, firmware, software, or a combination thereof. In some implementations, the method 700 is performed by a processor executing code stored in a non-transitory computer-readable medium (e.g., a memory). Briefly, the method 700 includes sending a token including a signature based on a key to a user device and sending a validation response based on the key to a cloud service provider.

The method 700 begins, in block 710, with the validation service provider sending, to a user device, a token, wherein the token includes a token identifier and a signature based on a key and data regarding a cloud service provider. In some implementations, the validation service provider sends the token to the user device in response to a token request received from the user device. In some implementations, the token request includes user credentials such as a user name and a password. In some implementations, the validation service provider sends the token to the user device periodically or in response to a change in authorization of the user device.

In some implementations, the validation service provider generates the token prior to sending the token to the user device. In some implementations, the validation service stores a set of user credentials in association with authorized cloud service providers and generates the token based on received user credentials of a token request.

As noted above, the token includes a token identifier. In some implementations, the token identifier is a universally unique identifier (UUID). In some implementations, the token is a JSON (JavaScript Object Notation) token.

In some implementations, the token indicates one or more cloud service providers the user device is authorized to access. In some implementations, the token includes a list of cloud service providers the user device is authorized to access and includes, for each cloud service provider of the list, data regarding the cloud service provider. In some implementations, the data regarding the cloud service provider includes one or more of a URL (Universal Resource Locator) of the cloud service provider, a service identifier of the cloud service provider, and a region identifier of the cloud service provider.

In some implementations, the token indicates one or more projects that the user device is authorized to access. For example, in some implementations, the data regarding the cloud service provider includes data regarding a project at least partially managed by the first cloud service provider. In some implementations, the token indicates one or more functionalities that the user device is authorized to perform. For example, in some implementations, the data regarding the cloud service provider includes data regarding a role with respect to a project (e.g., an administrator role or a user role). In some implementations, the token includes an expiration time.

As noted above, the token includes a signature based on a key and data regarding the cloud service provider. In some implementations, the validation service provider generates the signature based on the key and the data regarding the cloud service provider using a cryptographic hash function. In some implementations, the cryptographic hash function includes an MD (message-digest) cryptographic hash function, such as MD2, MD4, MD5, or MD6. In some implementations, the cryptographic has function includes an SHA (secure hash algorithm) cryptographic hash function, such as SHA-1, SHA-2, SHA-224, SHA-256, SHA-384, SHA-512, SHA-512/224, or SHA-512/256.

In some implementations, the validation service provider generates a message based on the data regarding the cloud service provider. For example, in some implementations, the validation service provider concatenates elements of the data regarding the cloud service provider in a specific order to generate the message. In some implementations, the validation service provider applies the key to the message to generate a message authentication code (MAC) that forms the signature. In some implementations, the validation service provider applies the key using a cryptographic hash function and, thus, the signature is a hash-based MAC (HMAC).

As noted above, in some implementations, the token includes a list of cloud service providers the user device is authorized to access and includes, for each cloud service provider of the list, data regarding the cloud service provider. In some implementations, the token includes, for each cloud service provider of the list, a signature based on a key (either the same key for each cloud service provider or different keys for each cloud service provider) and the data regarding the cloud service provider. In some implementations, the signature is further based on a project identifier and/or a role indication included in the token.

In some implementations, the validation service provider deletes the token 420 after sending the token to the user device. In some implementations, the validation service provider deletes the token, but stores the key (or keys) in association with the token identifier.

At block 720, the validation service provider receives, from the cloud service provider, a validation request for the user device, wherein the validation request includes the token identifier. At block 730, the validation service provider sends, to the cloud service provider in response to validation request, a validation response based on the key.

In some implementations, e.g., as described above with respect to FIG. 4, the validation request (of block 720) includes the data regarding the cloud service provider and the signature. Thus, in some implementations, the validation service provider retrieves the key associated with the token identifier, generates a regenerated signature based on the key and the data regarding the cloud service provider of the validation request, compares the regenerated signature to the signature of the validation request, and determines whether the user device is authorized to access the cloud service provider based on the comparison. For example, if the regenerated signature matches the signature of the validation request, the validation service provider determines that the user device is authorized to access the cloud service provider. Thus, in some implementations, the validation response (of block 730) includes an authorization indicating that the user device is authorized to access the cloud service provider.

In some implementations, e.g., as described above with respect to FIG. 5, the validation request (of block 720) includes the data regarding the cloud service provider, but does not include the signature. Thus, in some implementations, the validation service provider retrieves the key associated with the token identifier, generates a regenerated signature based on the key and the data regarding the cloud service provider of the validation request, and transmits the signature to the cloud service provider in the validation response. Thus, in some implementations, the validation response (of block 730) includes the regenerated signature based on the key and the data regarding the cloud service provider of the validation request.

In some implementations, e.g., as described above with respect to FIG. 6, the validation request (of block 720) does not include the data regarding the cloud service provider or the signature. Thus, in some implementations, the validation service provider retrieves the key associated with the token identifier and transmits the key to the cloud service provider in the validation response. Thus, in some implementations, the validation response (of block 730) includes the key.

Although the method 700 of FIG. 7 has been described above with respect to a user device attempting to access a single cloud service provider, it is to be appreciated that, in some implementations, the method 700 is performed for a user device attempting to access multiple cloud service providers. Further, in some implementations, the method 700 is performed for multiple user devices. In some implementations, the method 700 includes sending, to a user device, a token, wherein the token includes a token identifier, a first signature based on a first key and data regarding a first cloud service provider, and a second signature based on a second key and data regarding a second cloud service provider. In some implementations, the first key and the second key are the same key. In some implementations, the first key and the second key are different keys.

In some implementations, the method 700 includes receiving, from the first cloud service provider, a first validation request for the user device, wherein the validation request includes a token identifier, and sending, to the first cloud service provider in response to the first validation request, a first validation response based on the first key. In some implementations, the method 700 further includes receiving, from the second cloud service provider, a second validation request for the user device, wherein the second validation request includes the token identifier, and sending, to the second cloud service provider in response to the second validation request, a second validation response based on the second key.

In some implementations, the validation service provider deletes the token after sending the token to the user device. In some implementations, the validation service provider deletes the key after sending the validation response based on the key to the cloud service provider. In some implementations, the cloud service provider stores the validation response for later authorization of the user device.

Figure 8:
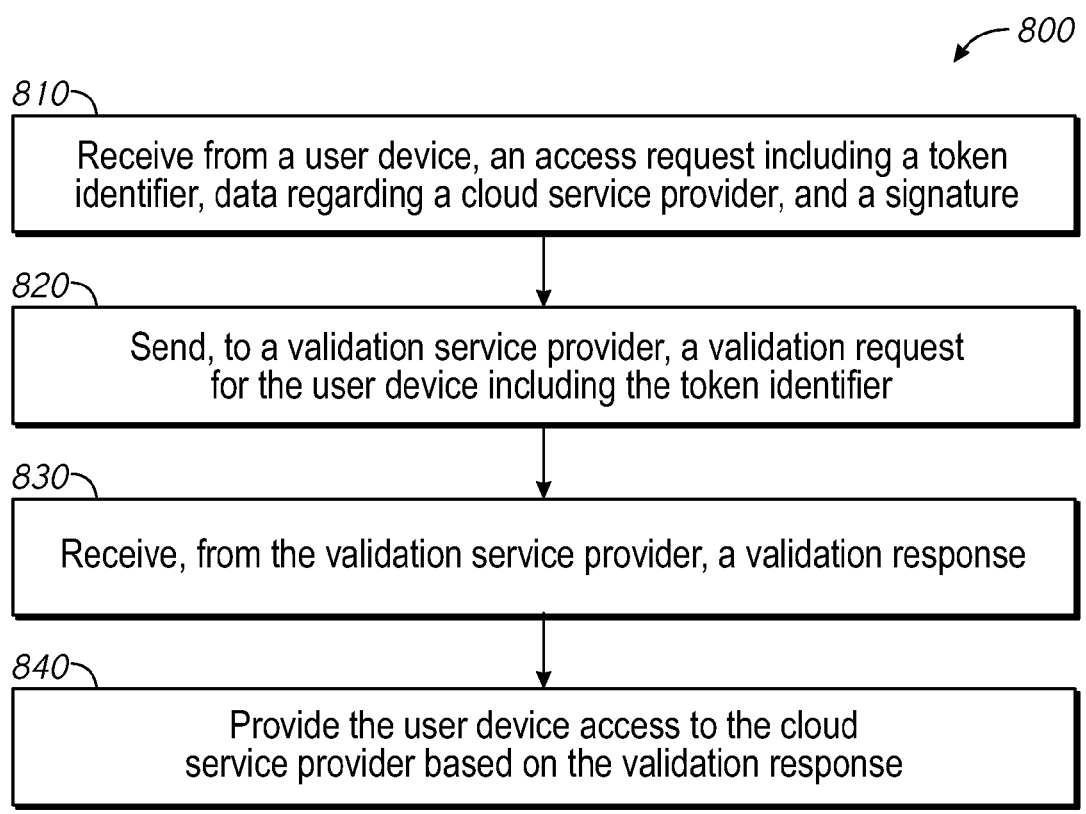
FIG. 8 is a flowchart representation of a method of providing a user device access to a cloud service provider in accordance with some implementations.

FIG. 8 is a flowchart representation of a method 800 of providing a user device access to a cloud service provider in accordance with some implementations. In some implementations (and as detailed below as an example), the method 800 is performed by a cloud service provider, such as the cloud service provider 121 of FIG. 1. In some implementations, the method 800 is performed by processing logic, including hardware, firmware, software, or a combination thereof. In some implementations, the method 800 is performed by a processor executing code stored in a non-transitory computer-readable medium (e.g., a memory). Briefly, the method 800 includes requesting validation from a validation service provider and providing the user device access to the cloud service based on the response.

The method 800 begins, in block 810, with the cloud service provider receiving, from a user device, an access request, wherein the access request includes a token identifier, data regarding a cloud service provider, and a signature. In some implementations, the signature is based on a key and the data regarding the cloud service provider.

At block 820, the cloud service provider sends, to a validation service provider, a validation request for the user device, wherein the validation request includes the token identifier. At block 830, the cloud service provider receives, from the validation service provider, a validation response. In some implementations, the validation response is based on the key. At block 840, the cloud service provider provides the user device access to the cloud service provider based on the validation response.

In some implementations, the cloud service provider responds to the access request of the user device (received in block 810) by sending, to the user device, an access response. In particular, if the cloud service provider determines that the user device is authorized to access the cloud service provider, the cloud service provider transmits an access response indicating that access has been granted. In some implementations, providing the user device access to the cloud service provider includes, exchanging cloud service interactions with the user device as the user device accesses the cloud service provider or the portion of the cloud service provider for which the user device is authorized as indicated by the data regarding the cloud service provider of the access request, e.g., a particular project or role).

In some implementations, e.g., as described above with respect to FIG. 4, the validation request (of block 820) includes the data regarding the cloud service provider and the signature and the validation response (of block 830) includes an authorization indicating that the user device is authorized to access the cloud service provider. Thus, in some implementations, providing the user device access to the cloud service provided based on the validation response (in block 840) includes providing the user device access to the cloud service provider based on receiving an authorization from the validation service provider.

In some implementations, the cloud service provider stores the authorization in association with the signature. Upon receiving a second access request from the user device at a later time, the cloud service provider grants access to the cloud service provider upon matching a second signature received in the second access request to the signature.

In some implementations, e.g., as described above with respect to FIG. 5, the validation request (of block 820) includes the data regarding the cloud service provider, but does not include the signature and the validation response (of block 830) includes a regenerated signature based on the key and the data regarding the cloud service provider of the validation request. Thus, in some implementations, providing the user device access to the cloud service provider based on the validation response (in block 840) includes comparing the regenerated signature to the signature (received from the user device in block 810) and determining that the user device is authorized to access the first cloud service provider based on the comparison. For example, if the regenerated signature matches the signature of the access request, the cloud service provider determines that the user device is authorized to access the cloud service provider. If the regenerated signature does not match the signature of the access request, the cloud service provider determines that the user device is not authorized to access the cloud service provider.

In some implementations, the cloud service provider stores the regenerated signature. Upon receiving a second access request from the user device at a later time, the cloud service provider grants access to the cloud service provider upon matching a second signature received in the second access request to the regenerated signature.

In some implementations, e.g., as described above with respect to FIG. 6, the validation request (of block 820) does not include the data regarding the cloud service provider or the signature and the validation response (of block 830) includes the key. Thus, in some implementations, providing the user device access to the cloud service provider based on the validation response (in block 840) includes generating a regenerated signature based on the key (received from the validation service provider in block 830) and the data regarding the cloud service provider (received from the user device in block 810), comparing the regenerated signature to the signature (received from the user device in block 810), and determining that the user device is authorized to access the first cloud service provider based on the comparison.

In some implementations, the cloud service provider stores the key. Upon receiving a second access request from the user device at a later time, the cloud service provider grants access to the cloud service provider upon matching a second signature received in the second access request to a second regenerated signature generated based on the key and the data regarding the cloud service provider received in the second access request.

Figure 9:
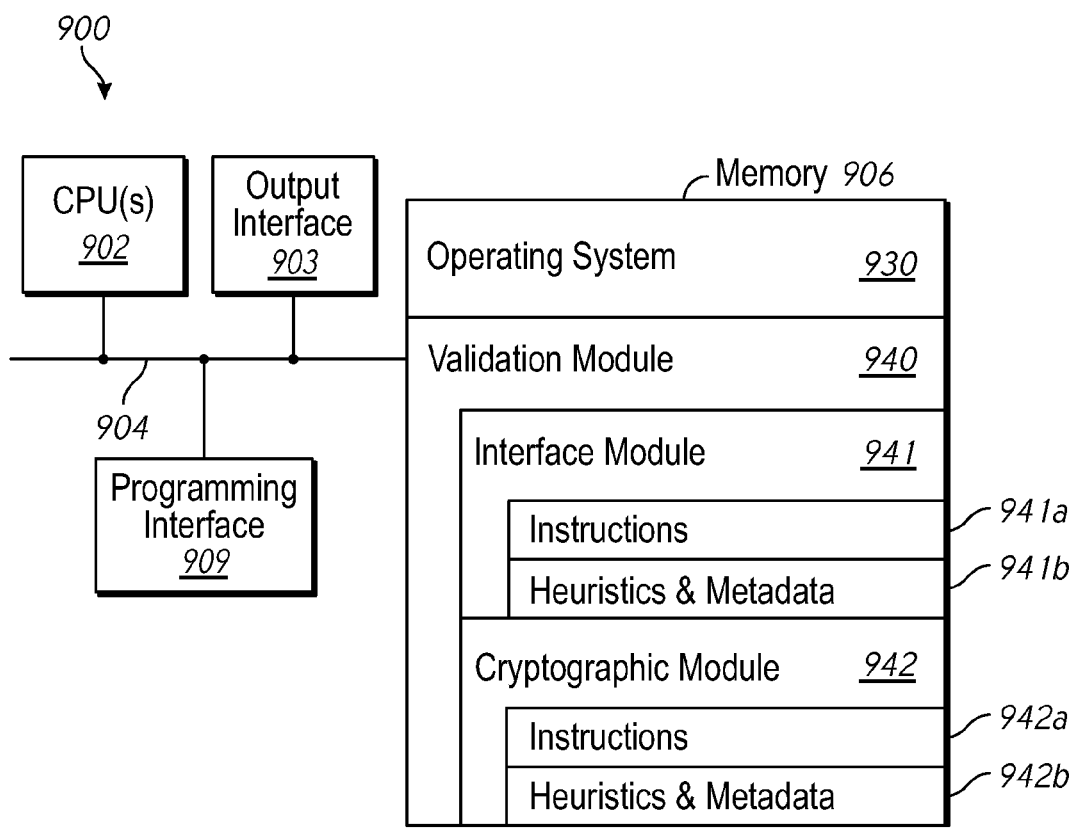
FIG. 9 is a block diagram of a computing device in accordance with some implementations.

FIG. 9 is a block diagram of a computing device 900 in accordance with some implementations. In some implementations, the computing device 900 corresponds to the validation service provider 131 of FIG. 1 and performs one or more of the functionalities described above with respect to the validation service provider 131. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 900 includes one or more processing units (CPU's) 902 (e.g., processors), one or more output interfaces 903 (e.g., a network interface), a memory 906, a programming interface 908, and one or more communication buses 904 for interconnecting these and various other components.

In some implementations, the communication buses 904 include circuitry that interconnects and controls communications between system components. The memory 906 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 906 optionally includes one or more storage devices remotely located from the CPU(s) 902. The memory 906 comprises a non-transitory computer readable storage medium. Moreover, in some implementations, the memory 906 or the non-transitory computer readable storage medium of the memory 906 stores the following programs, modules and data structures, or a subset thereof including an optional operating system 930 and a validation module 940. In some implementations, one or more instructions are included in a combination of logic and non-transitory memory. The operating system 930 includes procedures for handling various basic system services and for performing hardware dependent tasks. In some implementations, the validation module 940 is configured to validate a user device. To that end, the validation module 940 includes an interface module 941 and a cryptographic module 942.

In some implementations, the interface module 941 is configured to receive a token request from a user device and send a token to the user device. In some implementations, the interface module 941 is configured to receive a validation request from a cloud service provider and send a validation response to the cloud service provider. To that end, the interface module 941 includes a set of instructions 941a and heuristics and metadata 941b. In some implementations, the cryptographic module 942 is configured to generate the token based on a key. To that end, the cryptographic module 942 includes a set of instructions 942a and heuristics and metadata 942b. In some implementations, the token includes a token identifier and a signature based on a key and data regarding the cloud service provider. In some implementations, the validation request includes the token identifier. In some implementations, the validation response is based on the key.

Although the validation module 940, the interface module 941, and the cryptographic module 942 are illustrated as residing on a single computing device 900, it should be understood that in other embodiments, any combination of the validation module 940, the interface module 941, and the cryptographic module 942 reside in separate computing devices in various implementations. For example, in some implementations each of the validation module 940, the interface module 941, and the cryptographic module 942 reside on a separate computing device.

Figure 10:
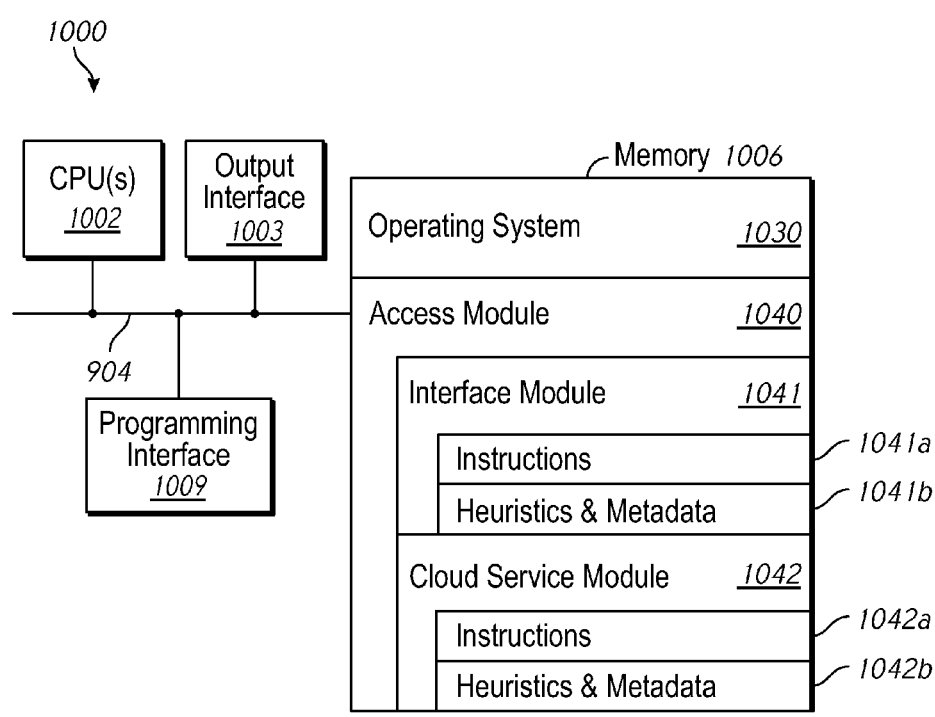
FIG. 10 is block diagram of another computing device in accordance with some implementations.

FIG. 10 is block diagram of another computing device 1000 in accordance with some implementations. In some implementations, the computing device 1000 corresponds to the cloud service provider 121 of FIG. 1 and performs one or more of the functionalities described above with respect to the cloud service provider 121. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 1000 includes one or more processing units (CPU's) 1002 (e.g., processors), one or more output interfaces 1003 (e.g., a network interface), a memory 1006, a programming interface 1008, and one or more communication buses 1004 for interconnecting these and various other components.

In some implementations, the communication buses 1004 include circuitry that interconnects and controls communications between system components. The memory 1006 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 1006 optionally includes one or more storage devices remotely located from the CPU(s) 1002. The memory 1006 comprises a non-transitory computer readable storage medium. Moreover, in some implementations, the memory 1006 or the non-transitory computer readable storage medium of the memory 1006 stores the following programs, modules and data structures, or a subset thereof including an optional operating system 1030 and an access module 1040. In some implementations, one or more instructions are included in a combination of logic and non-transitory memory. The operating system 1030 includes procedures for handling various basic system services and for performing hardware dependent tasks. In some implementations, the access module 1040 is configured to selectively provide a user device access to a cloud service. To that end, the access module 1040 includes an interface module 1041 and a cloud service module 1042.

In some implementations, the interface module 1041 is configured to receive an access request from a user device and send an access response to the user device. In some implementations, the interface module 1041 is configured to send a validation request to a validation service provider and receive a validation response from the validation service provider. To that end, the interface module 1041 includes a set of instructions 1041a and heuristics and metadata 1041b. In some implementations, the cloud service module 1042 is configured to provide a cloud service to the user device. To that end, the cloud service module 1042 includes a set of instructions 1042a and heuristics and metadata 1042b. In some implementations, the access request includes a token identifier, data regarding a cloud service provider, and a signature. In some implementations, the signature is based on a key. In some implementations, the validation request includes the token identifier. In some implementations, the validation response is based on the key. In some implementations, the user device is provided access to the cloud service based on the validation response.

Although the access module 1040, the interface module 1041, and the cloud service module 1042 are illustrated as residing on a single computing device 1000, it should be understood that in other embodiments, any combination of the access module 1040, the interface module 1041, and the cloud service module 1042 reside in separate computing devices in various implementations. For example, in some implementations each of the access module 1040, the interface module 1041, and the cloud service module 1042 reside on a separate computing device.

Moreover, FIGS. 9 and 10 are intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIGS. 9 and 10 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact. Also as used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

Further as used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   sending, to a user device, a token, wherein the token includes a token identifier and a first signature, wherein the first signature is based on a first key and data regarding a first cloud service provider;
   receiving, from the first cloud service provider, a first validation request for the user device, wherein the validation request includes the token identifier; and
   sending, to the first cloud service provider in response to the first validation request, a first validation response based on the first key.

2. The method of claim 1, wherein the token further includes a second signature, wherein the second signature is based on a second key and data regarding a second cloud service provider, the method further comprising:
   receiving, from the second cloud service provider, a second validation request for the user device, wherein the second validation request includes the token identifier; and
   sending, to the second cloud service provider in response to the second validation request, a second validation response based on the second key.

3. The method of claim 1, further comprising generating the first signature by applying the first key using a cryptographic hash function to the data regarding the first cloud service provider.

4. The method of claim 1, wherein the first validation request further includes the data regarding the first cloud service provider and the first signature and wherein the first validation response includes an authorization indicating that the user device is authorized to access the cloud service provider.

5. The method of claim 4, further comprising:
   generating a first regenerated signature, wherein the first regenerated signature is based on the first key and the data regarding the first cloud service provider of the validation request;
   comparing the first regenerated signature to the first signature of the validation request; and
   determining that the user device is authorized to access the first cloud service provider based on the comparison.

6. The method of claim 1, wherein the first validation request includes the data regarding the first cloud service provider and the first validation response includes a first regenerated signature, wherein the first regenerated signature is based on the first key and the data regarding the first cloud service provider of the validation request.

7. The method of claim 1, wherein the first validation response includes the first key.

8. The method of claim 1, wherein the data regarding the first cloud service provider includes a universal resource locator (URL) of the first cloud service provider.

9. The method of claim 1, wherein the data regarding the first cloud service provider includes data regarding a project at least partially managed by the first cloud service provider.

10. The method of claim 9, wherein the data regarding the first cloud service provider includes data regarding a role with respect to the project.

11. The method of claim 1, further comprising deleting the token after sending the token to the user device.

12. A method comprising:
    receiving, from a user device, an access request, wherein the access request includes a token identifier, data regarding a cloud service provider, and a signature, wherein the signature is based on a key and the data regarding the cloud service provider;
    sending, to a validation service provider, a validation request for the user device, wherein the validation request includes the token identifier;
    receiving, from the validation service provider, a validation response; and
    providing the user device access to the cloud service provider based on the validation response.

13. The method of claim 12, wherein the validation request further includes the data regarding the cloud service provider and the signature and wherein the validation response indicates that the user device is authenticated.

14. The method of claim 12, wherein the validation request further includes the data regarding the cloud service provider and the validation response includes a regenerated signature, wherein the regenerated signature is based on the key and the data regarding the cloud service provider.

15. The method of claim 12, wherein the validation response includes the key.

16. The method of claim 15, further comprising:
    generating a regenerated signature, wherein the regenerated signature is based on the key and the data regarding the cloud service provider;
    comparing the regenerated signature to the signature; and
    determining that the user device is authorized to access the first cloud service provider based on the comparison.

17. A system comprising:
    a network interface;
    one or more processors; and
    a non-transitory memory comprising instructions that when executed cause the one or more processors to perform operations including:
    sending, to a user device via the network interface, a token, wherein the token includes a token identifier and a first signature, wherein the first signature is based on a key and data regarding a cloud service provider;
    receiving, from the cloud service provider via the network interface, a validation request for the user device, wherein the validation request includes the token identifier;
    and
    sending, to the cloud service provider via the network interface in response to validation request, a validation response based on the key.

18. The system of claim 17, the operations further comprising generating the signature by applying the key using a cryptographic hash function to the data regarding the cloud service provider.

19. The system of claim 17, wherein the validation request further includes the data regarding the cloud service provider and the signature, the operations further comprising:

generating a regenerated signature, wherein the regenerated signature is based on the key and the data regarding the cloud service provider of the validation request;
comparing the regenerated signature to the signature of the validation request; and
determining that the user device is authenticated based on the comparison, wherein the validation response indicates that the user device is authenticated.

20. The system of claim 17, wherein the validation response includes the key.

* * * * *